UNITED STATES PATENT OFFICE.

JOHN E. LAUER, OF NEW YORK, N. Y.

IMPROVED SUBSTITUTE FOR YEAST FOR BAKING PURPOSES.

Specification forming part of Letters Patent No. 60,201, dated December 4, 1866.

*To all whom it may concern:*

Be it known that I, JOHN E. LAUER, of the city, county, and State of New York, have invented a new and Improved Substitute for Yeast for Baking Purposes; and I do hereby declare that the following is a full, clear, and exact statement of the component parts of, and the manner of compounding, the same.

This invention consists in an improved preparation of muriate of phosphate of lime, obtained by treating ground bones with hydrochloric (commercial muriatic) acid. This preparation, in the form of a powder, on being mixed with a suitable quantity of bicarbonate of soda, forms a superior and more wholesome substitute for yeast for the purpose of raising bread. The bones must be first exhausted of gelatine by the action of steam, or burned to whiteness in an open kiln, then dried, and ground to a fine powder. I then take of the bone-dust and of hydrochloric (commercial muriatic) acid, equal parts by weight, mix and stir them well together, and afterward dry the mixture, and grind to a fine pulverulent state. This pulverulent muriate of phosphate of lime is now ready for use, or to be put up in bottles or air-tight packages for the market. When used, about two parts, by weight, of bicarbonate of soda should be added to five parts of the pulverulent muriate of phosphate of soda; and these two ingredients, mixed with the flour and water, in the proportion of about one ounce, or two tea-spoonsfuls, to every pound of flour, will raise the dough in such manner that when baked the bread will have a light and good texture.

Bread thus made will be less liable to sour on a weak stomach, and be more easy of digestion, than bread raised by yeast or other substitute therefor.

What I claim as my invention, and desire to secure by Letters Patent, is—

1. The preparation of muriate of phosphate of lime herein described.

2. The mixture of the above-described preparation of muriate of phosphate of lime with an alkaline carbonate, as a substitute for yeast in raising bread.

JNO. E. LAUER.

Witnesses:
A. LE CLERC,
J. W. COOMBS.